United States Patent
Atta et al.

(10) Patent No.: US 10,423,438 B2
(45) Date of Patent: Sep. 24, 2019

(54) VIRTUAL MACHINES CONTROLLING SEPARATE SUBSETS OF PROGRAMMABLE HARDWARE

(71) Applicant: Amazon Technologies, Inc., Seattle, WA (US)

(72) Inventors: Islam Mohamed Hatem Abdulfattah Mohamed Atta, Vancouver (CA); Mark Bradley Davis, Austin, TX (US); Robert Michael Johnson, Austin, TX (US); Christopher Joseph Pettey, Woodinville, WA (US); Asif Khan, Cedar Park, TX (US); Nafea Bshara, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 127 days.

(21) Appl. No.: 15/282,282

(22) Filed: Sep. 30, 2016

(65) Prior Publication Data
US 2018/0095774 A1    Apr. 5, 2018

(51) Int. Cl.
| G06F 9/455 | (2018.01) |
| G06F 9/50 | (2006.01) |
| G06F 15/76 | (2006.01) |

(52) U.S. Cl.
CPC ........ *G06F 9/45558* (2013.01); *G06F 9/5044* (2013.01); *G06F 9/5077* (2013.01);
(Continued)

(58) Field of Classification Search
CPC ....... G06F 9/45558; G06F 2009/45587; G06F 9/5044; G06F 9/5077; G06F 15/76; G06F 2209/509; G06F 2209/549
See application file for complete search history.

(56) References Cited

U.S. PATENT DOCUMENTS

| 6,011,407 A | 1/2000 | New |
| 6,476,634 B1 | 11/2002 | Bilski |

(Continued)

FOREIGN PATENT DOCUMENTS

| WO | WO 02/01425 | 1/2002 |
| WO | WO 2013/158707 | 10/2013 |
| WO | WO 2015/042684 | 4/2015 |

OTHER PUBLICATIONS

Hutchings et al. Implementation Approaches for Reconfigurable Logic Applications. [online] (1995)., pp. 1-11. Retrieved From the Internet <https://pdfs.semanticscholar.org/75eb/2fa2408a0caf05361a7e4a352e87e890b862.pdf> (Year: 1995).*

(Continued)

Primary Examiner — Emerson C Puente
Assistant Examiner — Jonathan R Labud
(74) Attorney, Agent, or Firm — Klarquist Sparkman LLP

(57) ABSTRACT

In a multi-tenant environment, separate virtual machines can be used for configuring and operating different subsets of programmable integrated circuits, such as a Field Programmable Gate Array (FPGA). The programmable integrated circuits can communicate directly with each other within a subset, but cannot communicate between subsets. Generally, all of the subsets of programmable ICs are within a same host server computer within the multi-tenant environment, and are sandboxed or otherwise isolated from each other so that multiple customers can share the resources of the host server computer without knowledge or interference with other customers.

20 Claims, 8 Drawing Sheets

(52) U.S. Cl.
CPC .... *G06F 15/76* (2013.01); *G06F 2009/45587* (2013.01); *G06F 2209/509* (2013.01); *G06F 2209/549* (2013.01)

(56) References Cited

U.S. PATENT DOCUMENTS

| | | |
|---|---|---|
| 6,539,438 B1 | 3/2003 | Ledzius et al. |
| 6,785,816 B1 | 8/2004 | Kivimaki et al. |
| 6,802,026 B1 | 10/2004 | Patterson |
| 6,826,717 B1 | 11/2004 | Draper et al. |
| 7,177,961 B2 | 2/2007 | Brice, Jr. et al. |
| 7,281,082 B1 | 10/2007 | Knapp |
| 7,564,727 B1 | 7/2009 | Huang |
| 7,716,497 B1 | 5/2010 | Timberger |
| 7,734,859 B2 | 6/2010 | Daniel et al. |
| 7,739,092 B1 | 6/2010 | Ballagh et al. |
| 7,902,866 B1 | 3/2011 | Patterson |
| 7,904,629 B2 | 3/2011 | Daniel |
| 7,962,582 B2 | 6/2011 | Potti et al. |
| 8,145,894 B1 | 3/2012 | Casselman |
| 8,516,272 B2 | 8/2013 | Hofstee et al. |
| 8,621,597 B1 | 12/2013 | Jenkins, IV |
| 8,626,970 B2 | 1/2014 | Craddock et al. |
| 8,881,141 B2 | 11/2014 | Koch et al. |
| 9,038,072 B2 | 5/2015 | Nollet et al. |
| 9,064,058 B2 | 6/2015 | Daniel |
| 9,098,662 B1 | 8/2015 | Chin et al. |
| 9,104,453 B2 | 8/2015 | Anand et al. |
| 9,141,747 B1 | 9/2015 | Orthner |
| 9,218,195 B2 | 12/2015 | Anderson et al. |
| 9,298,865 B1 | 3/2016 | Peng |
| 9,483,639 B2 | 11/2016 | Sliwa et al. |
| 9,503,093 B2 * | 11/2016 | Karras ............... G06F 17/5068 |
| 9,590,635 B1 | 3/2017 | Sengupta |
| 9,619,292 B2 | 4/2017 | Kodialam et al. |
| 9,684,743 B2 | 6/2017 | Larzul |
| 9,983,938 B2 | 5/2018 | Heil et al. |
| 10,027,543 B2 | 7/2018 | Lanka et al. |
| 2004/0236556 A1 | 11/2004 | Lin |
| 2005/0198235 A1 | 9/2005 | Kumar et al. |
| 2008/0013569 A1 | 1/2008 | Boren |
| 2008/0028186 A1 | 1/2008 | Casselman |
| 2010/0161870 A1 | 6/2010 | Daniel |
| 2011/0047546 A1 * | 2/2011 | Kivity ............... G06F 12/1009 718/1 |
| 2012/0005473 A1 | 1/2012 | Hofstee et al. |
| 2012/0254885 A1 | 10/2012 | Cal et al. |
| 2013/0145431 A1 | 6/2013 | Kruglick |
| 2013/0205295 A1 | 8/2013 | Ebcioglu et al. |
| 2013/0318240 A1 | 11/2013 | Hebert et al. |
| 2014/0215424 A1 | 7/2014 | Fine et al. |
| 2014/0297405 A1 | 10/2014 | Fine |
| 2014/0351811 A1 | 11/2014 | Kruglick |
| 2014/0380025 A1 | 12/2014 | Kruglick |
| 2015/0169376 A1 | 6/2015 | Chang et al. |
| 2015/0227662 A1 | 8/2015 | Lepercq |
| 2016/0034295 A1 * | 2/2016 | Cochran ............. G06F 9/45558 718/1 |
| 2016/0094413 A1 | 3/2016 | Jain |
| 2016/0111168 A1 | 4/2016 | Cline et al. |
| 2016/0239906 A1 | 8/2016 | Kruglick |
| 2016/0285628 A1 | 9/2016 | Carrer et al. |
| 2016/0321081 A1 | 11/2016 | Kim et al. |
| 2016/0371021 A1 | 12/2016 | Goldberg et al. |
| 2017/0090992 A1 | 3/2017 | Bivens et al. |
| 2017/0153854 A1 | 6/2017 | Zheng |
| 2017/0187831 A1 | 6/2017 | Otting et al. |
| 2017/0213053 A1 | 7/2017 | Areno et al. |
| 2018/0034793 A1 | 2/2018 | Kibalo et al. |
| 2018/0075231 A1 | 3/2018 | Subramanian et al. |
| 2018/0077144 A1 | 3/2018 | Gangawane et al. |
| 2018/0088174 A1 | 3/2018 | Davis et al. |
| 2018/0088992 A1 | 3/2018 | Davis et al. |
| 2018/0089119 A1 | 3/2018 | Khan et al. |
| 2018/0089343 A1 | 3/2018 | Atta |
| 2018/0091484 A1 | 3/2018 | Atta et al. |
| 2018/0095670 A1 | 4/2018 | Davis et al. |

OTHER PUBLICATIONS

Byma et al., "FPGAs in the Cloud: Booting Virtualized Hardware Accelerators with OpenStack," 2014 IEEE 22nd Annual International Symposium on Field-Programmable Custom Computing Machines, May 2014, pp. 109-116.

"SDAccel Development Environment User Guide," Xilinx, Inc., © 2016, 85 pages.

"The Xilinx SDAccel Development Environment Bringing the Best Performance/Watt to the Data Center," Xilinx, Inc., © 2014, 6 pages.

Chen et al., "Enabling FPGAs in the Cloud," Proceedings of the 11th ACM Conference on Computing Frontiers, May 2014, pp. 1-10.

Eguro et al., "FPGAs for trusted cloud computing," 2012 22nd International Conference on Field Programmable Logic and Applications, Aug. 2012, pp. 63-70.

Eslami et al., "Enabling Effective FPGA Debug Using Overlays: Opportunities and Challenges," 2nd International Workshop on Overlay Architectures for FPGAs, Jun. 2016, pp. 1-6.

International Search Report and Written Opinion for PCT/US2017/054176, dated Jan. 5, 2018, 11 pages.

"SDAccel Development Environment," Xilinx, Inc., document downloaded from http://www.xilinx.com/products/design-tools/software-zone/sdaccel.html on Jul. 25, 2016, 9 pages.

Weerasinghe et al., "Enabling FPGAs in Hyperscale Data Centers," 2015 IEEE 12th International Conference on Ubiquitous Intelligence and Computing, 2015 IEEE 12th International Conference on Autonomic and Trusted Computing, and 2015 IEEE 15th Conference on Scalable Computing and Communications and Its Associated Workshops, Aug. 2015, pp. 1078-1086.

Fahmy et al., "Virtualized FPGA Accelerators for Efficient Cloud Computing," 2015 IEEE 7th International Conference on Cloud Computing Technology and Science, 2015, pp. 430-435.

Zazo et al., "A PCIe DMA engine to support the virtualization of 40 Gbps FPGA-accelerated network appliances," 2015 IEEE International Conference on Reconfigurable Computing and FPGAS, Dec. 2015, pp. 1-6.

Xilinx, "7 Series FPGAs Overview," Advance Product Specification, DS180 (v1.6), Mar. 28, 2011.

\* cited by examiner

VIRTUAL MACHINES CONTROLLING SEPARATE SUBSETS OF PROGRAMMABLE HARDWARE

BACKGROUND

Cloud computing is the use of computing resources (hardware and software) which are available in a remote location and accessible over a network, such as the Internet. In some arrangements, users are able to buy these computing resources (including storage and computing power) as a utility on demand. Cloud computing entrusts remote services with a user's data, software and computation. Use of virtual computing resources can provide a number of advantages including cost advantages and/or the ability to adapt rapidly to changing computing resource needs.

The users of large computer systems may have diverse computing requirements resulting from different use cases. A cloud or compute service provider can provide various different computer systems having different types of components with varying levels of performance and/or functionality. Thus, a user can select a computer system that can potentially be more efficient at executing a particular task. For example, the compute service provider can provide systems with varying combinations of processing performance, memory performance, storage capacity or performance, and networking capacity or performance. Generally, multiple customers can share and leverage generic resources offered by the compute service provider, making it more cost efficient for customers to use the compute service provider's services.

BRIEF DESCRIPTION OF THE DRAWINGS

FIG. 2 is an example system diagram including multiple virtual machines controlling multiple programmable ICs with the programmable ICs, which have a communication channel there between.

DETAILED DESCRIPTION

Figure 1:
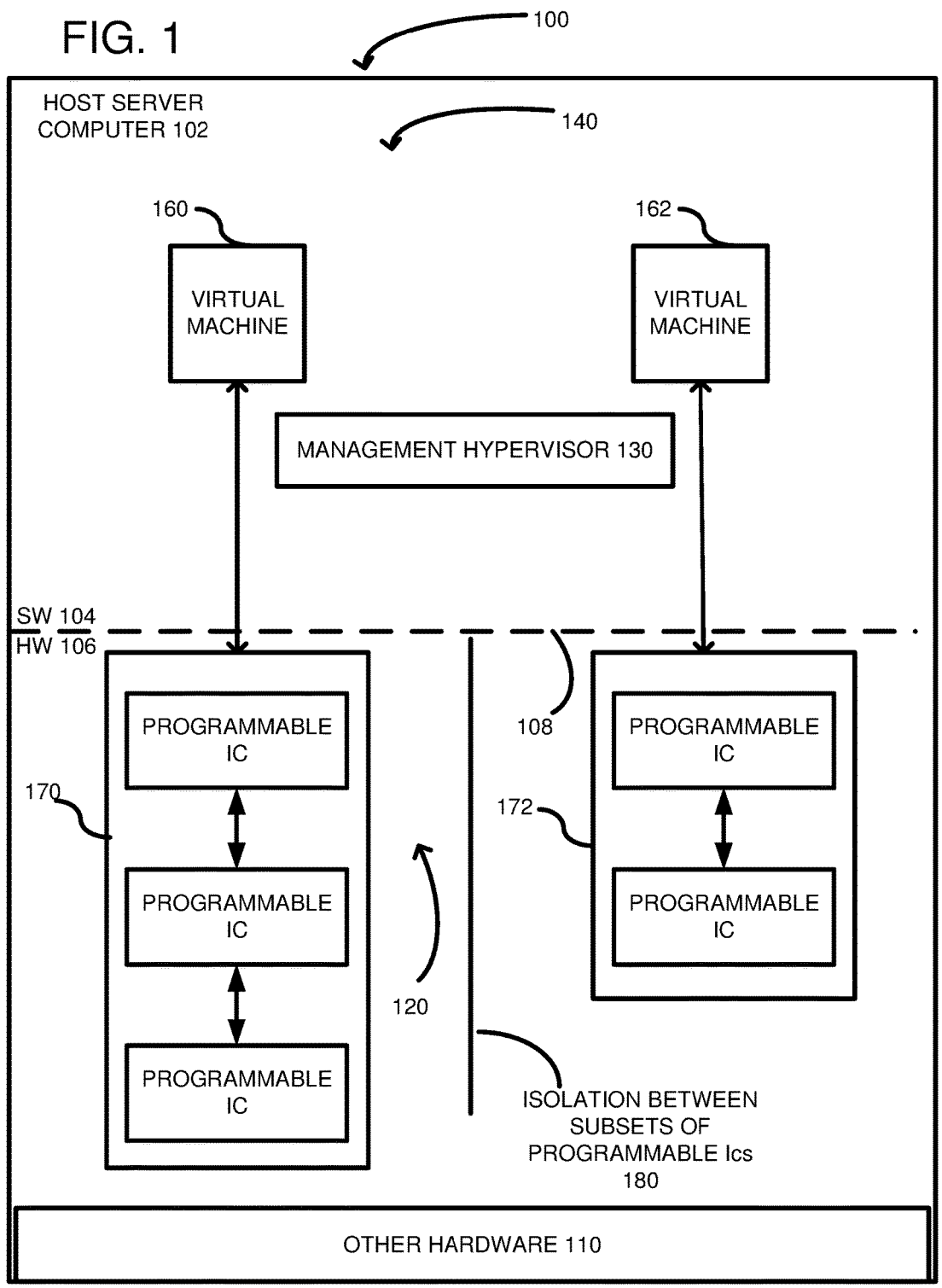
FIG. 1 is a system diagram including virtual machines controlling subsets of programmable integrated circuits (ICs).

Providing custom hardware in a cloud environment, in some respects, goes against one of the core benefits of sharing generic hardware, such as a server computer, across multiple customers. However, programmable logic, such as a Field Programmable Gate Array (FPGA), is sufficiently generic and can be programmed by customers and then reused by other customers. Thus, one solution for providing specialized computing resources within a set of reusable general computing resources is to provide a server computer comprising a configurable logic platform (such as by providing a server computer with an add-in card including one or more FPGAs) as a choice among the general computing resources. Configurable logic is hardware that can be programmed or configured to perform a logic function that is specified by configuration data that is applied to or loaded on the configurable logic. For example, a user of the computing resources can provide a specification (such as source code written in a hardware description language) for configuring the configurable logic, the configurable logic can be configured according to the specification and the configured logic can be used to perform a task for the user. However, allowing a user access to low-level hardware of the computing facility can potentially introduce security and privacy issues within the computing facility. As a specific example, a faulty or malicious design from one user could potentially cause a denial of service to other users if the configured logic caused one or more server computers within the computing facility to malfunction (e.g., crash, hang, or reboot) or be denied network services. As another specific example, a faulty or malicious design from one user could potentially corrupt or read data from another user if the configured logic is able to read and/or write memory of the other user's memory space.

As described herein, a compute service's facility can include a variety of computing resources, where one type of the computing resources can include a server computer comprising a configurable logic platform. The configurable logic platform can be programmed or configured by a user of the computer system so that hardware (e.g., the configurable logic) of the computing resource is customized by the user. For example, the user can program the configurable logic so that it functions as a hardware accelerator that is tightly coupled to the server computer. As a specific example, the hardware accelerator can be accessible via a local interconnect, such as Peripheral Component Interconnect Express (PCI-Express or PCIe), of the server computer. The user can execute an application on the server computer and tasks of the application can be performed by the hardware accelerator using PCIe transactions. By tightly coupling the hardware accelerator to the server computer, the latency between the accelerator and the server computer can be reduced which can potentially increase the processing speed of the application.

A customer can launch several virtual machines on a host server computer and the separate virtual machines can be used to configure and operate different subsets of configurable logic. In some embodiments, the configurable logic can include multiple FPGAs, so that a virtual machine can simultaneously operate one or more FPGAs within a subset. Operating the FPGAs includes transmitting and receiving data to/from the FPGAs. On the same host server computer a separate virtual machine can simultaneously operate another subset of one or more FPGAs. The FPGAs in a subset can be programmed to communicate with each other. However, separate subsets can be restricted from cross communicating for security reasons. Thus, sandboxing of the FPGA subsets on a host server computer in a cloud environment allows multiple customers to have access to their own respective programmable logic in a subset. Cross communication of the FPGAs within a subset allows multiple FPGAs to be utilized by the virtual machines and the FPGAs can communicate with each other without requiring communication through a hypervisor.

The compute service provider can potentially increase the security and/or availability of the computing resources by wrapping or encapsulating (i.e., sandboxing) the user's hardware (also referred to herein as application logic) within host logic of the configurable logic platform. Encapsulating the application logic can include limiting or restricting the application logic's access to configuration resources, physical interfaces, hard macros of the configurable logic platform, and various peripherals of the configurable logic platform. For example, the compute service provider can manage the programming of the configurable logic platform so that it includes both the host logic and the application logic. The host logic can provide a framework or sandbox for the application logic to work within. In particular, the host logic can communicate with the application logic and constrain the functionality of the application logic. For example, the host logic can perform bridging functions between the local interconnect (e.g., the PCIe interconnect) and the application logic so that the application logic cannot directly control the signaling on the local interconnect. The host logic can be responsible for forming packets or bus transactions on the local interconnect and ensuring that the protocol requirements are met. By controlling transactions on the local interconnect, the host logic can potentially prevent malformed transactions or transactions to out-of-bounds locations. As another example, the host logic can isolate a configuration access port so that the application logic cannot cause the configurable logic platform to be reprogrammed without using services provided by the compute service provider.

FIG. 1 is a system diagram showing an example computing system 100 including a host server computer 102 having a software portion 104 and a hardware portion 106 diagrammatically separated by dashed line 108. The hardware portion 106 includes one or more CPUs, memory, storage devices, etc. shown generically as other hardware at 110. The hardware portion 106 can further include programmable Integrated Circuits (ICs), shown generally at 120. The programmable ICs can be FPGAs or other types of programmable logic, such as complex programmable logic devices (CPLDs). The programmable ICs are designed to be programmed by customers after manufacturing. The programmable ICs contain an array of programmable hardware logic blocks and configurable interconnects linking the hardware logic blocks together. The logic blocks can be programmed to perform hardware functions from simple gates to complex combinational functions. Any number of programmable ICs 120 can be used in the host server computer 102 as further described below. Additionally, the programmable ICs can be on one or more plug-in cards within the server or located on the server motherboard.

Running a layer above the hardware 106 is a hypervisor or kernel layer, shown in this example as including a management hyperviser 130. The hypervisor or kernel layer can be classified as a type 1 or type 2 hypervisor. A type 1 hypervisor runs directly on the host hardware to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. The management hypervisor 130 can generally include device drivers needed for accessing the hardware 106.

The software layer 104 can include a plurality of partitions for running virtual machines, shown generally at 140. The partitions are logical units of isolation by the hypervisor and are executing virtual machines. Each partition can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions. Each virtual machine 140 communicates with the hardware layer 106 through the management hypervisor 130. Thus, a single management hypervisor 130 can manage multiple virtual machines and how the virtual machines interact with the programmable ICs 120. Alternatively, after mapping of the virtual machines to the programmable ICs, the virtual machines can directly operate the programmable ICs. Two different virtual machines 160, 162 are shown sharing resources of the host server computer 102, but any number of virtual machines can be used. However, the virtual machines are isolated from each other such that one virtual machine is unable to access resources of another virtual machine. For example, virtual machine 160 is shown having control over the operation of subset 170 of programmable ICs, while virtual machine 162 is shown having control over subset 172 of programmable ICs. Within a subset, the programmable ICs can communicate with each other. However, communication is restricted between subsets for security reasons. Thus, a virtual machine can configure (program) and operate (control and receive/transmit data) an entire subset of one or more programmable ICs. However, the subsets 170, 172 are isolated as shown at 180 and cannot communicate there between. Configuration of the programmable ICs can be accomplished by direct commands from the virtual machines or through indirect commands. Additionally, different subsets of programmable ICs can having differing numbers of programmable ICs. For example, subset 170 has 3 programmable ICs, while subset 172 has two programmable ICs. Subsets can also have an equal number of programmable ICs in the basic configuration.

In one example, the hypervisor can be a Xen-based hypervisor, although other hypervisors can be used as described above. In the Xen example, the management hypervisor 130 is Domain 0 (also called Dom 0), while the virtual machines 160, 162 are Domain U guests. The Domain 0 hypervisor has special rights to access physical I/O resources as well as interact with the Domain U guests. The Domain U guests do not have access to the hardware layer 106 without authorization from the Domain 0. As such, the Domain 0 is a management layer that ensures separation of the subsets of programmable ICs 170, 172.

The management hypervisor 130 is responsible for ensuring the programmable ICs 120 remain sandboxed. Additionally, the management hypervisor 130 can have control of an interface bus, such as a PCIe interface. Through the interface, the management hypervisor 130 has management and control of security of the hardware in the programmable ICs 120. In this way, the management hypervisor 130 can securely manage the programmable ICs configuration ports and protect the IP programmed within the programmable ICs. Additionally, the management hypervisor 130 can serve as a main interface to external managed services for configuration and operation of the programmable ICs.

Figure 2:
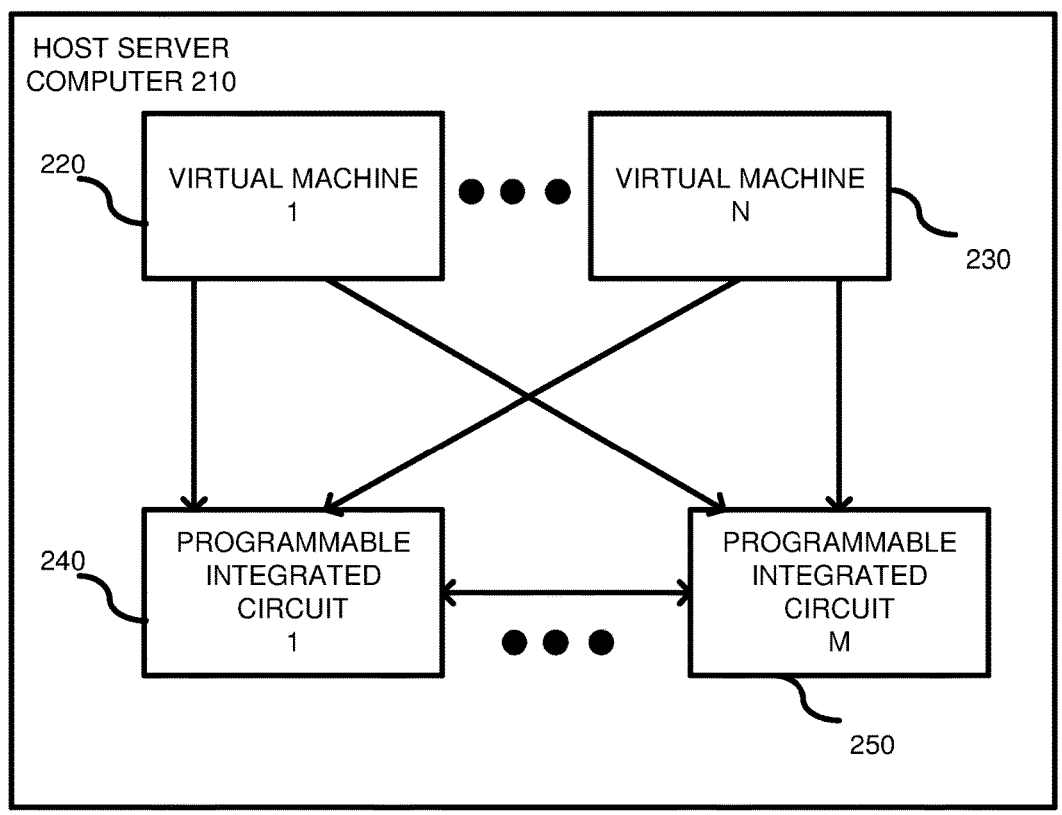

FIG. 2 shows a host server computer 210 that can be used for hosting multiple virtual machines 220 through 230, wherein the number of virtual machines can be any integer number N. The virtual machines 220-230 can jointly program and configure multiple programmable ICs 240, 250, wherein the number of programmable ICs can be any number M, wherein M is an integer number. Thus, virtual machine 1 through virtual machine N can operate the programmable IC 240 using separate portions of the programmable IC. Specifically, portions of the programmable IC 240 can be programmed by virtual machine 220 while other portions can be programmed by virtual machine 230. However, the portions operate independently. Likewise, the programmable ICs 250 can be programmed and operated by multiple of the virtual machines. Moreover, the programmable ICs 240-250 can communicate with each other, such as through a serial port. Typically, cross communication between programmable ICs are for portions of the programmable ICs that are associated with one virtual machine, whereas cross communication between portions associated with different virtual machines is tightly controlled or not allowed. In one example, the programmable ICs 240-250 can be used to implement separate accelerators associated with the virtual machines.

Figure 3:
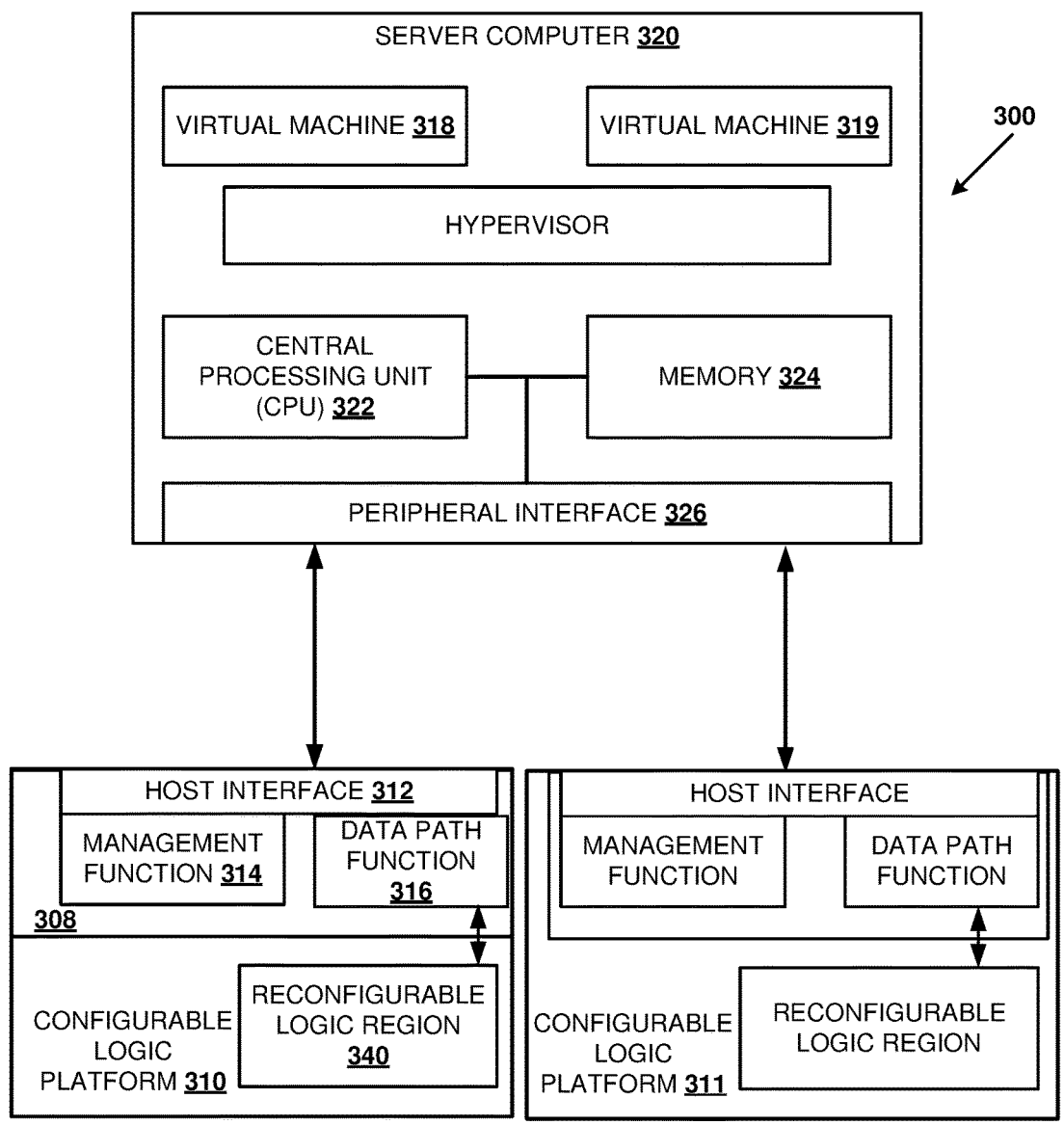
FIG. 3 is an example host server computer including multiple virtual machines for controlling different configurable logic platforms.

FIG. 3 is a system diagram showing an example of a computing system 300 including two or more configurable logic platforms 310, 311 and a server computer 320. The configurable logic platforms are example embodiments of the programmable ICs of FIGS. 1 and 2. The computing system 300 provides additional details of the host server computer 102 from FIG. 1. The server computer 320 can be used to execute an application program for an end-user. Specifically, the server computer 320 can include a central processing unit (CPU) 322, memory 324, and a peripheral interface 326. The CPU 322 can be used to execute instructions stored in the memory 324. For example, the memory 324 can be loaded with all or a portion of the application program and the CPU 322 can execute the instructions of the application program. The application program can communicate with a hardware accelerator or other hardware logic of the configurable logic platform 310 by issuing transactions using the peripheral interface 326. The server computer 320 can be used to execute multiple virtual machines 318, 319. Additional virtual machines can be executed.

As used herein, a transaction is a communication between components. As specific examples, a transaction can be a read request, a write, a read response, a message, an interrupt, or other various exchanges of information between components. The transaction can occur on a bus shared by multiple components. Specifically, values of signal lines of the bus can be modulated to transfer information on the bus using a communications protocol of the bus. The transaction can occur over one or more phases, such as an address phase and one or more data phases. Additionally or alternatively, the transaction can occur using one or more serial lines of a point-to-point interconnect that connects two components. Specifically, the transaction can be sent in a packet that is transmitted over the point-to-point interconnect.

The peripheral interface 326 can include a bridge for communicating between the CPU 322 using a local or front-side interconnect and components using a peripheral or expansion interconnect. Specifically, the peripheral interface 326 can be connected to a physical interconnect that is used to connect the server computer 320 to the configurable logic platform 310 and/or to other components. For example, the physical interconnect can be an expansion bus for connecting multiple components together using a shared parallel bus or serial point-to-point links. As a specific example, the physical interconnect can be PCI express, PCI, or another physical interconnect that tightly couples the server computer 320 to the configurable logic platform 310. Thus, the server computer 320 and the configurable logic platforms 310, 311 can communicate using PCI bus transactions or PCIe packets, for example. Although the server computer 320 is shown as a separate box than the configurable logic platforms 310, 311 they are typically within the same hardware chassis. Most typically, the configurable logic platforms 310, 311 are on one or more plug-in cards in the host server computer.

The configurable logic platform 310 can include host logic 308 and a reconfigurable logic region 340. The host logic 308 can include a host interface 312, a management function 314, and data path function 316. The host logic 308 can be programmable logic provided by a compute service provider and provides management functions over the configurable logic platform 310. The reconfigurable logic region 340 can include hardware that is configurable to implement the hardware accelerator or application logic provided by the customer. In other words, the reconfigurable logic region 340 can include hardware logic that is programmable to perform a given function. For example, the reconfigurable logic region 340 can include programmable hardware logic blocks comprising combinational logic and/or look-up tables (LUTs) and sequential logic elements (such as flip-flops and/or latches), programmable routing and clocking resources, programmable distributed and block random access memories (RAMs), digital signal processing (DSP) bitslices, and programmable input/output pins.

The host logic 308 can be used to encapsulate or sandbox the reconfigurable logic region 340. For example, the reconfigurable logic region 340 can interface with various components of the configurable hardware platform using predefined interfaces so that the reconfigurable logic region 340 is restricted in the functionality that it can perform. As one example, the reconfigurable logic region can interface with static host logic that is loaded prior to the reconfigurable logic region 340 being configured. For example, the static host logic can include logic that isolates different components of the configurable logic platform 310 from the reconfigurable logic region 340. As one example, hard macros of the configurable logic platform 310 (such as a configuration access port or circuits for signaling on the physical interconnect) can be masked off so that the reconfigurable logic region 340 cannot directly access the hard macros.

The host logic 308 can include the host interface 312 for communicating with the server computer 320. Specifically, the host interface 312 can be used to connect to the physical interconnect and to communicate with the server computer 320 using a communication protocol of the physical interconnect. As one example, the server computer 320 can communicate with the configurable logic platform 310 using a transaction including an address associated with the configurable logic platform 310. Similarly, the configurable logic platform 310 can communicate with the server computer 320 using a transaction including an address associated with the server computer 320. The addresses associated with the various devices connected to the physical interconnect can be predefined by a system architect and programmed into software residing on the devices. Additionally or alternatively, the communication protocol can include an enumeration sequence where the devices connected to the physical interconnect are queried and where addresses are assigned to each of devices as part of the enumeration sequence. As one example, the peripheral interface 326 can issue queries to each of the devices connected to the physical interconnect. The host interface 312 can respond to the queries by providing information about the configurable logic platform 310, such as how many functions are present on the configurable logic platform 310, and a size of an address range associated with each of the functions of the configurable logic platform 310. Based on this information, addresses of the computing system 300 can be allocated such that each function of each device connected to the physical interconnect is assigned a non-overlapping range of addresses. In this way, an association or mapping of the virtual machines to the configurable logic platforms can be established. After enumeration, the host interface 312 can route transactions to functions of the configurable logic platform 310 based on an address of the transaction.

The host logic can include the management function 314 that can be used for managing and configuring the configurable logic platform 310. Commands and data can be sent from the server computer 320 to the management function 314 using transactions that target the address range of the management function 314. For example, the server computer 320 can generate transactions to transfer data (e.g., configuration data) and/or write control registers of the configurable logic platform 310 that are mapped to one or more addresses within the address range of the management function 314. Writing the control registers can cause the configurable logic platform 310 to perform operations, such as configuring and managing the configurable logic platform 310. As a specific example, configuration data corresponding to application logic to be implemented in the reconfigurable logic region 340 can be transmitted from the server computer 320 to the configurable logic platform 310 in one or more transactions over the physical interconnect. A transaction to configure the reconfigurable logic region 340 with the configuration data can be transmitted from the server computer 320 to the configurable logic platform 310. Specifically, the transaction can write a value to a control register mapped to the management function 314 address space to begin configuring the reconfigurable logic region 340. Separate transactions 350 can come from each virtual machine 318, 319 in order to program the reconfigurable logic region 340. In one embodiment, the configuration data can be transferred from the server computer 320 to the configurable logic platform 310 before the configuration of the reconfigurable logic region 340 begins. For example, the management function 314 can cause the configuration data to be stored in an on-chip or off-chip memory accessible by the configurable logic platform 310, and the configuration data can be read from the memory when the reconfigurable logic region 340 is being configured. In another embodiment, the configuration data can be transferred from the server computer 320 to the configurable logic platform 310 after the configuration of the reconfigurable logic region 340 begins. For example, a control register can be written to begin configuration of the reconfigurable logic region 340 and the configuration data can be streamed into or loaded onto the reconfigurable logic region 340 as transactions including the configuration data are processed by the management function 314.

The host logic can include a data path function 316 that can be used to exchange information (e.g., application input/output 160) between the server computer 320 and the configurable logic platform 310. Specifically, commands and data can be sent from the server computer 320 to the data path function 316 using transactions that target the address range of the data path function 316. Similarly, the configurable logic platform 310 can communicate with the server computer 320 using a transaction including an address associated with the server computer 320. The data path function 316 can act as a translation layer between the host interface 312 and the reconfigurable logic region 340. Specifically, the data path function 316 can include an interface for receiving information from the reconfigurable logic region 340 and the data path function 316 can format the information for transmission from the host interface 312. Formatting the information can include generating control information for one or more transactions and partitioning data into blocks that are sized to meet protocol specifications. Thus, the data path function 316 can be interposed between the reconfigurable logic region 340 and the physical interconnect. In this manner, the reconfigurable logic region 340 can potentially be blocked from formatting transactions and directly controlling the signals used to drive the physical interconnect so that the reconfigurable logic region 340 cannot be used to inadvertently or maliciously violate protocols of the physical interconnect.

The configurable logic platform 311 can have a similar structure to the configurable logic platform 310 and is not described for purposes of brevity. However, it should be noted that the reconfigurable logic platform can also include a host logic region and a reconfigurable logic region, in which customer hardware logic can be programmed. Both virtual machines 318, 319 can operate and control their respective configurable logic platforms 310, 311. For example virtual machine 318 can configure and operate configurable logic platform 310, while virtual machine 319 can configure and operate the configurable logic platform 311. The configurable logic platform 310 can be an FPGA and additional FPGAs can be added to the subset so that the virtual machine 318 configures and operates multiple FPGAs in a subset. Virtual machine 319 can similarly configure and operate the configurable logic platform 311 and other FPGAs in a subset. The subsets can have differing numbers of FPGAs and within a subset, the FPGAs can cross communicate with each other through a serial interface or other communication means. However, communication between subsets is typically prohibited.

In an alternative embodiment, multiple subsets can be controlled by the same virtual machine, such as virtual machine 318. In such a case, cross-communication between subsets can occur through the virtual machine 318. For example, the reconfigurable logic region 340 on the configurable logic platform 310 can communicate with the virtual machine 318, which can then transmit the communication to the other reconfigurable logic region on configurable logic platform 311. In this example, the virtual machine 319 is not in control of, nor can it access, either of the configurable logic platforms 310, 311.

Figure 4:
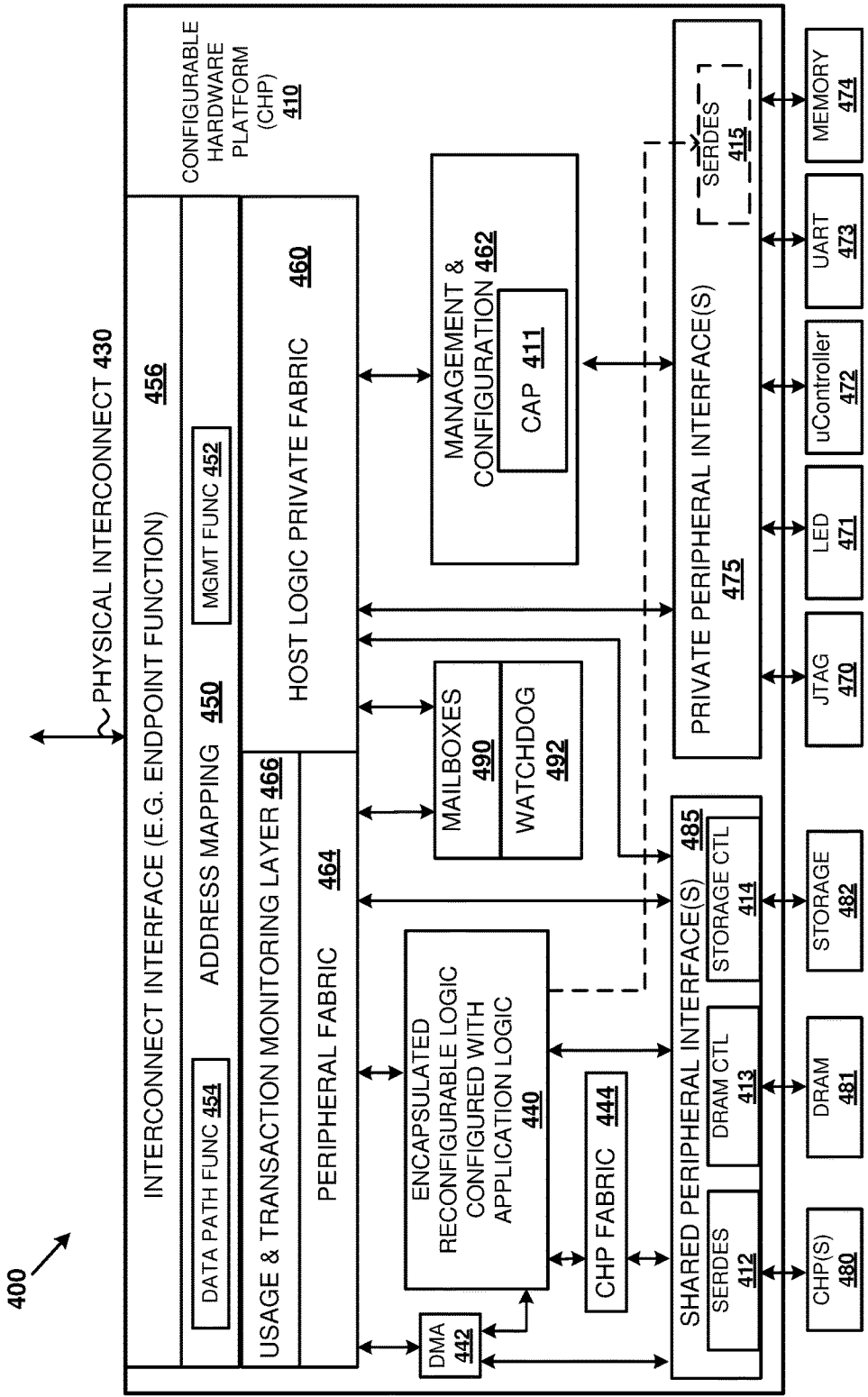
FIG. 4 shows further details of an example configurable hardware platform.

FIG. 4 is a system diagram showing an example of a system 400 including a configurable hardware platform 410. A server computer (not shown) can be coupled and the configurable hardware platform 410 via a physical interconnect 430. For example, the physical interconnect 430 can be PCI express, PCI, or any other interconnect that tightly couples the server computer to the configurable hardware platform 410. The configurable hardware platform 410 can include reconfigurable logic blocks and other hardware. The reconfigurable logic blocks can be configured or programmed to perform various hardware functions of the configurable hardware platform 410. The reconfigurable logic blocks can be programmed multiple times with different configurations so that the blocks can perform different functions over the lifetime of the device. The functions of the configurable hardware platform 410 can be categorized based upon the purpose or capabilities of each function, or based upon when the function is loaded into the configurable hardware platform 410. For example, the configurable hardware platform 410 can include static hardware logic, reconfigurable hardware logic, and hard macros. The functionality for the static logic, reconfigurable logic, and hard macros can be configured at different times. Thus, the functionality of the configurable hardware platform 410 can be loaded incrementally.

A hard macro can perform a predefined function and can be available when the configurable hardware platform 410 is powered on. For example, a hard macro can include hard-wired circuits that perform a specific function. As specific examples, the hard macros can include a configuration access port (CAP) 411 for configuring the configurable hardware platform 410, a serializer-deserializer transceiver (SERDES) 412 for communicating serial data, a memory or dynamic random access memory (DRAM) controller 413 for signaling and controlling off-chip memory (such as a double data rate (DDR) DRAM 481), and a storage controller 414 for signaling and controlling a storage device 482. Although a SERDES transceiver is shown, other types of communication ports can be used as the shared peripheral interface. Other types include, but are not limited to, Ethernet, a ring topology, or other types of networking interfaces. Additionally, the SERDES interface is a high-speed multi-lane serial interface and other serial ports with multi-lane communication paths can be used. The shared peripheral interface can be used for cross communication between programmable ICs, such as shown in FIG. 1 with communication between programmable ICs in subset 170. In a specific example, the SerDes interface can be used for cross communication between ICs.

The static logic can be loaded at boot time onto reconfigurable logic blocks. For example, configuration data specifying the functionality of the static logic can be loaded from an on-chip or off-chip flash memory device during a boot-up sequence. The boot-up sequence can include detecting a power event (such as by detecting that a supply voltage has transitioned from below a threshold value to above the threshold value) and de-asserting a reset signal in response to the power event. An initialization sequence can be triggered in response to the power event or the reset being de-asserted. The initialization sequence can include reading configuration data stored on the flash device and loading the configuration data onto the configurable hardware platform 410 using the configuration access port 411 so that at least a portion of the reconfigurable logic blocks are programmed with the functionality of the static logic. After the static logic is loaded, the configurable hardware platform 410 can transition from a loading state to an operational state that includes the functionality of the static logic.

The reconfigurable logic can be loaded onto reconfigurable logic blocks while the configurable hardware platform 410 is operational (e.g., after the static logic has been loaded). The configuration data corresponding to the reconfigurable logic can be stored in an on-chip or off-chip memory and/or the configuration data can be received or streamed from an interface (e.g., the interconnect interface 456) of the configurable hardware platform 410. The reconfigurable logic can be divided into non-overlapping regions, which can interface with static logic. For example, the reconfigurable regions can be arranged in an array or other regular or semi-regular structure. For example, the array structure may include holes or blockages where hard macros are placed within the array structure. The different reconfigurable regions can communicate with each other, the static logic, and the hard macros by using signal lines that can be specified as static logic. The different reconfigurable regions can be configured at different points in time so that a first reconfigurable region can be configured at a first point in time and a second reconfigurable region can be configured at a second point in time.

The functions of the configurable hardware platform 410 can be divided or categorized based upon the purpose or capabilities of the functions. For example, the functions can be categorized as control plane functions, data plane functions, and shared functions. A control plane can be used for management and configuration of the configurable hardware platform 410. The data plane can be used to manage data transfer between accelerator logic loaded onto the configurable hardware platform 410 and the server computer. Shared functions can be used by both the control plane and the data plane. The control plane functionality can be loaded onto the configurable hardware platform 410 prior to loading the data plane functionality. The data plane can include encapsulated reconfigurable logic configured with application logic 440. The control plane can include host logic of the configurable hardware platform 410.

Generally, the data plane and the control plane can be accessed using different functions of the configurable hardware platform 410, where the different functions are assigned to different address ranges. Specifically, the control plane functions can be accessed using a management function 452 and the data plane functions can be accessed using a data path function or an data path function 454. An address mapping layer 450 can differentiate transactions bound for the control plane or the data plane. In particular, transactions from the server computer bound for the configurable hardware platform 410 can be identified using an address within the transaction. Specifically, if the address of the transaction falls within the range of addresses assigned to the configurable hardware platform 410, the transaction is destined for the configurable hardware platform 410. The transaction can be sent over the physical interconnect 430 and received at the interconnect interface 456. The interconnect interface 456 can be an endpoint of the physical interconnect 430. It should be understood that the physical interconnect 430 can include additional devices (e.g., switches and bridges) arranged in a fabric for connecting devices or components to the server computer.

The address mapping layer 450 can analyze the address of the transaction and determine where to route the transaction within the configurable hardware platform 410 based on the address. For example, the management function 452 can be assigned a first range of addresses and different functions of the management plane can be accessed by using different addresses within that range. Transactions with addresses falling within the range assigned to the management function 452 can be routed through the host logic private fabric 460 to the different blocks of the control plane. For example, transactions can be addressed to a management and configuration block 462. Similarly, the data path function 454 can be assigned a second range of addresses and different functions of the data plane can be accessed by using different addresses within that range. Using the different address mappings, an association can be made between the regions and the virtual machines and/or hypervisor.

The management and configuration block 462 can include functions related to managing and configuring the configurable hardware platform 410. For example, the management and configuration block 462 can provide access to the configuration access port 411 so that the reconfigurable logic blocks can be configured. For example, the server computer can send a transaction to the management and configuration block 462 to initiate loading of the application logic within the encapsulated reconfigurable logic 440. The configuration data corresponding to the application logic can be sent from the server computer to the management function 452. The management function 452 can route the configuration data corresponding to the application logic through the host logic fabric 460 to the configuration access port 411 so that the application logic can be loaded. The shared peripherals 485 can be used for inter-communication within a subset of programmable ICs. For example, the Serdes interface 412 can be used to allow programmable ICs to communicate with each other without communications passing through a hypervisor on the server computer.

Isolation (such as is shown at 180 in FIG. 1) between subsets of programmable ICs can occur using a number of techniques, such as physical or logical isolation. First, the SERDES interface 412 can be programmed by host logic within the shared peripheral interface 485 to enable or disable a physical link (i.e., a communication path) between programmable ICs. Enabling the link can establish a physical communication path between the programmable ICs, whereas disabling the link can break such a physical communication path. In a simple example, a communication path (e.g., ring topology or other type of communication path) can be provided between PCIe cards within a host server computer and that communication path can be disabled where appropriate to isolate subsets of programmable ICs. Disabling or enabling of the SERDES interface 412 can occur through the management function 452 or the host logic private fabric 460 that can program (set or clear) a bit to couple the communication path or disconnect the communication path. A second technique can be to include a SERDES interface 415 in the private peripheral interface 475 (shown in dashed lines to indicate an alternative or supplementary embodiment). The private peripheral interface 475 can include host logic that decides based on packet addresses to/from application logic 440 whether to receive/forward the packets. In this way, the private peripheral interface 475 can logically isolate subsets of programmable ICs. For example, if the application logic 440 attempts to transmit a packet to a subset controlled by another virtual machine, the private peripheral interface 475 can drop the packet or otherwise reject the transmission. Thus, a host-controlled interface located on the programmable ICs can monitor the packets and control transmission of the packets based on access privileges to establish the logical connection or logical isolation. Additionally, received packets are only accepted by the SERDES interface if the host logic within the private peripheral interface 475 recognizes a valid source address.

The management and configuration block 462 can store metadata about the configurable hardware platform 410. For example, versions of the different logic blocks, update histories, and other information can be stored in memory of the management and configuration block 462. The server computer can read the memory to retrieve some or all of the metadata. Specifically, the server computer can send a read request targeting the memory of the management and configuration block 462 and the management and configuration block 462 can generate read response data to return to the server computer.

The management function 452 can also be used to access private peripherals of the configurable hardware platform 410. The private peripherals are components that are only accessible from the control plane. For example, the private peripherals can include a JTAG (e.g., IEEE 1149.1) controller 470, light emitting displays (LEDs) 471, a microcontroller 472, a universal asynchronous receiver/transmitter (UART) 473, a memory 474 (e.g., a serial peripheral interface (SPI) flash memory), and any other components that are accessible from the control plane and not the data plane. The management function 452 can access the private peripherals by routing commands through the host logic private fabric 460 and the private peripheral interface(s) 475. The private peripheral interface(s) 475 can directly communicate with the private peripherals.

Shared peripherals are shared functions that are accessible from either the control plane or the data plane. For example, the shared peripherals can be accessed from the control plane by addressing transactions within the address range assigned to the management function 452. The shared peripherals can be accessed from the data plane by addressing transactions within the address range assigned to the data path function 454. Thus, the shared peripherals are components that can have multiple address mappings and can be used by both the control plane and the data plane. Examples of the shared peripherals are other configurable hardware platform(s) (CHP(s)) 480, DRAM 481 (e.g., DDR DRAM), storage devices 482 (e.g., hard disk drives and solid-state drives), and other various components that can be used to generate, store, or process information. The shared peripherals can be accessed via the shared peripheral interfaces 485. Thus, the shared peripheral interfaces 485 can be an intermediary layer transposed between the shared peripherals and the other functions of the configurable hardware platform 410. Specifically, the shared peripheral interfaces 485 can translate requests from the control plane or the data plane and format communications to the shared peripherals into a native protocol of the shared peripherals.

Mailboxes 490 and watchdog timers 492 are shared functions that are accessible from either the control plane or the data plane. Specifically, the mailboxes 490 can be used to pass messages and other information between the control plane and the data plane. For example, the mailboxes 490 can include buffers, control registers (such as semaphores), and status registers. By using the mailboxes 490 as an intermediary between the control plane and the data plane, isolation between the data plane and the control plane can potentially be increased which can increase the security of the configurable hardware platform 410.

The watchdog timers 492 can be used to detect and recover from hardware and/or software malfunctions. For example, a watchdog timer 492 can monitor an amount of time taken to perform a particular task, and if the amount of time exceeds a threshold, the watchdog timer 492 can initiate an event, such as writing a value to a control register or causing an interrupt or reset to be asserted. As one example, the watchdog timer 492 can be initialized with a first value when beginning a first task. The watchdog timer 492 can automatically count down after it is initialized and if the watchdog timer 492 reaches a zero value, an event can be generated. Alternatively, if the first task finishes before the watchdog timer 492 reaches a zero value, the watchdog timer 492 can be reinitialized with a second value when beginning a second task. The first and second values can be selected based on a complexity or an amount of work to complete in the first and second tasks, respectively.

The data path function 454 can be used to access the data plane functions, such as the application logic 440. For example, a transaction directed to the application logic 440 can cause data to be loaded, processed, and/or returned to the server computer. Specifically, the data plane functions can be accessed using transactions having an address within the range assigned to the data path function 454. For example, a transaction can be sent from the server computer to the application logic 440 via the data path function 454. Specifically, transactions addressed to the data path function 454 can be routed through the peripheral fabric 464 to the application logic 440. Responses from the application logic 440 can be routed through the peripheral fabric 464 to the data path function 454, and then back to the server computer. Additionally, the data and transactions generated by the application logic 440 can be monitored using a usage and transaction monitoring layer 466. The monitoring layer 466 can potentially identify transactions or data that violate predefined rules and can generate an alert to be sent over the control plane. Additionally or alternatively, the monitoring layer 466 can terminate any transactions generated by the application logic 440 that violate any criteria of the monitoring layer 466. Additionally, the monitoring layer 466 can analyze information moving to or from the application logic 440 so that statistics about the information can be collected and accessed from the control plane.

Data can also be transferred between the server computer and the application logic by programming a direct memory access (DMA) engine 442. The DMA engine 442 can include control and status registers for programming or specifying DMA transfers from a source location to a destination location. As one example, the DMA engine 442 can be programmed to pull information stored within the memory 424 of server computer into the application logic 440 or into the shared peripherals of the configurable hardware platform 410. As another example, the DMA engine 442 can be programmed to push data that has been generated by the application logic 440 to the memory 424 of the server computer. The data generated by the application logic 440 can be streamed from the application logic 440 or can be written to the shared peripherals, such as the memory 481 or storage 482.

The application logic 440 can communicate with other configurable hardware platforms 480. For example, the other configurable hardware platforms 480 can be connected by one or more serial lines that are in communication with the SERDES 412. The application logic 440 can generate transactions to the different configurable hardware platforms 480, and the transactions can be routed through the CHP fabric 444 to the corresponding serial lines (via the SERDES 412) of the configurable hardware platforms 480. Similarly, the application logic 440 can receive information from other configurable hardware platforms 480 using the reverse path.

In sum, the functions of the configurable hardware platform 410 can be categorized as control plane functions and data path functions. The control plane functions can be used to monitor and restrict the capabilities of the data plane. The data plane functions can be used to accelerate a user's application that is running on the server computer. By separating the functions of the control and data planes, the security and availability of the server computer and other computing infrastructure can potentially be increased. For example, the application logic 440 cannot directly signal onto the physical interconnect 430 because the intermediary layers of the control plane control the formatting and signaling of transactions of the physical interconnect 430. As another example, the application logic 440 can be prevented from using the private peripherals which could be used to reconfigure the configurable hardware platform 410 and/or to access management information that may be privileged. As another example, the application logic 440 can access hard macros of the configurable hardware platform 410 through intermediary layers so that any interaction between the application logic 440 and the hard macros is controlled using the intermediary layers.

Figure 5:
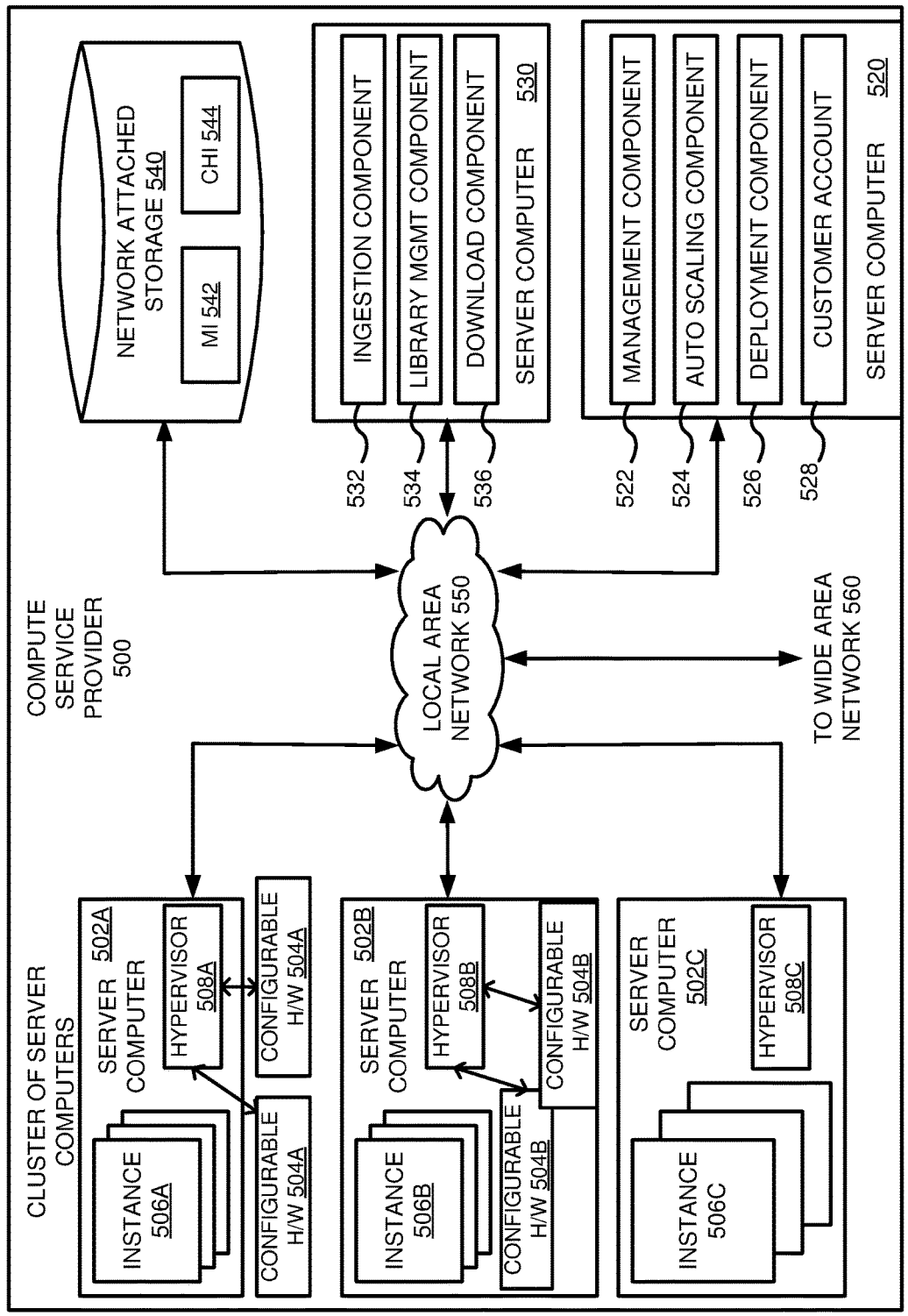
FIG. 5 is an example system diagram showing a plurality of virtual machine instances running in a multi-tenant environment including server computers having multiple configurable logic platforms.

FIG. 5 is a computing system diagram of a network-based compute service provider 500 that illustrates one environment in which embodiments described herein can be used. By way of background, the compute service provider 500 (i.e., the cloud provider) is capable of delivery of computing and storage capacity as a service to a community of end recipients. In an example embodiment, the compute service provider can be established for an organization by or on behalf of the organization. That is, the compute service provider 500 may offer a "private cloud environment." In another embodiment, the compute service provider 500 supports a multi-tenant environment, wherein a plurality of customers operate independently (i.e., a public cloud environment). Generally speaking, the compute service provider 500 can provide the following models: Infrastructure as a Service ("IaaS"), Platform as a Service ("PaaS"), and/or Software as a Service ("SaaS"). Other models can be provided. For the IaaS model, the compute service provider 500 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. Additionally, application developers can develop and run their hardware solutions on configurable hardware of the compute service provider platform. The SaaS model allows installation and operation of application software in the compute service provider. In some embodiments, end users access the compute service provider 500 using networked client devices, such as desktop computers, laptops, tablets, smartphones, etc. running web browsers or other lightweight client applications. Those skilled in the art will recognize that the compute service provider 500 can be described as a "cloud" environment.

The particular illustrated compute service provider 500 includes a plurality of server computers 502A-502C. While only three server computers are shown, any number can be used, and large centers can include thousands of server computers. The server computers 502A-502C can provide computing resources for executing software instances 506A-506C. In one embodiment, the software instances 506A-506C are virtual machines. As known in the art, a virtual machine is an instance of a software implementation of a machine (i.e. a computer) that executes applications like a physical machine. In the example of a virtual machine, each of the servers 502A-502C can be configured to execute a hypervisor 508 or another type of program configured to enable the execution of multiple software instances 506 on a single server. Additionally, each of the software instances 506 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

The server computers 502A-502C can include a heterogeneous collection of different hardware resources or instance types. Some of the hardware instance types can include configurable hardware that is at least partially configurable by a user of the compute service provider 500. One example of an instance type can include the server computer 502A which is in communication with configurable hardware 504A. Specifically, the server computer 502A and the configurable hardware 504A can communicate over a local interconnect such as PCIe. Another example of an instance type can include the server computer 502B and configurable hardware 504B. For example, the configurable logic 504B can be integrated within a multi-chip module or on the same die as a CPU of the server computer 502B. Thus, hardware instance types with and without configurable logic can be present within the resources of the compute service provider 500. The configurable hardware 504 can be configured and operated from multiple instances 506, which can then control operation of the configurable hardware simultaneously. As shown, the server computer 502 can have a one-to-one configuration wherein each instance 506 controls one or more configurable hardware 504.

One or more server computers 520 can be reserved for executing software components for managing the operation of the server computers 502 and the software instances 506. For example, the server computer 520 can execute a management component 522. A customer can access the management component 522 to configure various aspects of the operation of the software instances 506 purchased by the customer. For example, the customer can purchase, rent or lease instances and make changes to the configuration of the software instances. The configuration information for each of the software instances can be stored as a machine image (MI) 542 on the network-attached storage 540. Specifically, the MI 542 describes the information used to launch a VM instance. The MI can include a template for a root volume of the instance (e.g., an OS and applications), launch permissions for controlling which customer accounts can use the MI, and a block device mapping which specifies volumes to attach to the instance when the instance is launched. The MI can also include a reference to a configurable hardware image (CHI) 544 which is to be loaded on configurable hardware 504 when the instance is launched. The CHI includes configuration data for programming or configuring at least a portion of the configurable hardware 504.

The customer can also specify settings regarding how the purchased instances are to be scaled in response to demand. The management component can further include a policy document to implement customer policies. An auto scaling component 524 can scale the instances 506 based upon rules defined by the customer. In one embodiment, the auto scaling component 524 allows a customer to specify scale-up rules for use in determining when new instances should be instantiated and scale-down rules for use in determining when existing instances should be terminated. The auto scaling component 524 can consist of a number of subcomponents executing on different server computers 502 or other computing devices. The auto scaling component 524 can monitor available computing resources over an internal management network and modify resources available based on need.

A deployment component 526 can be used to assist customers in the deployment of new instances 506 of computing resources. The deployment component can have access to account information associated with the instances, such as who is the owner of the account, credit card information, country of the owner, etc. The deployment component 526 can receive a configuration from a customer that includes data describing how new instances 506 should be configured. For example, the configuration can specify one or more applications to be installed in new instances 506, provide scripts and/or other types of code to be executed for configuring new instances 506, provide cache logic specifying how an application cache should be prepared, and other types of information. The deployment component 526 can utilize the customer-provided configuration and cache logic to configure, prime, and launch new instances 506. The configuration, cache logic, and other information may be specified by a customer using the management component 522 or by providing this information directly to the deployment component 526. The instance manager can be considered part of the deployment component.

Customer account information 528 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, a listing of the MI's and CHI's accessible to the customer, etc.

One or more server computers 530 can be reserved for executing software components for managing the download of configuration data to configurable hardware 504 of the server computers 502. For example, the server computer 530 can execute a logic repository service comprising an ingestion component 532, a library management component 534, and a download component 536. The ingestion component 532 can receive host logic and application logic designs or specifications and generate configuration data that can be used to configure the configurable hardware 504. The library management component 534 can be used to manage source code, user information, and configuration data associated with the logic repository service. For example, the library management component 534 can be used to store configuration data generated from a user's design in a location specified by the user on the network-attached storage 540. In particular, the configuration data can be stored within a configurable hardware image 542 on the network-attached storage 540. Additionally, the library management component 534 can manage the versioning and storage of input files (such as the specifications for the application logic and the host logic) and metadata about the logic designs and/or the users of the logic repository service. The library management component 534 can index the generated configuration data by one or more properties such as a user identifier, an instance type, a marketplace identifier, a machine image identifier, and a configurable hardware identifier, for example. The download component 536 can be used to authenticate requests for configuration data and to transmit the configuration data to the requestor when the request is authenticated. For example, agents on the server computers 502A-B can send requests to the download component 536 when the instances 506 are launched that use the configurable hardware 504. As another example, the agents on the server computers 502A-B can send requests to the download component 536 when the instances 506 request that the configurable hardware 504 be partially reconfigured while the configurable hardware 504 is in operation.

The network-attached storage (NAS) 540 can be used to provide storage space and access to files stored on the NAS 540. For example, the NAS 540 can include one or more server computers used for processing requests using a network file sharing protocol, such as Network File System (NFS). The NAS 540 can include removable or non-removable media, including magnetic disks, storage area networks (SANs), redundant arrays of independent disks (RAID), magnetic tapes or cassettes, CD-ROMs, DVDs, or any other medium which can be used to store information in a non-transitory way and which can be accessed over the network 550.

The network 550 can be utilized to interconnect the server computers 502A-502C, the server computers 520 and 530, and the storage 540. The network 550 can be a local area network (LAN) and can be connected to a Wide Area Network (WAN) 560 so that end users can access the compute service provider 500. It should be appreciated that the network topology illustrated in FIG. 5 has been simplified and that many more networks and networking devices can be utilized to interconnect the various computing systems disclosed herein.

Figure 6:
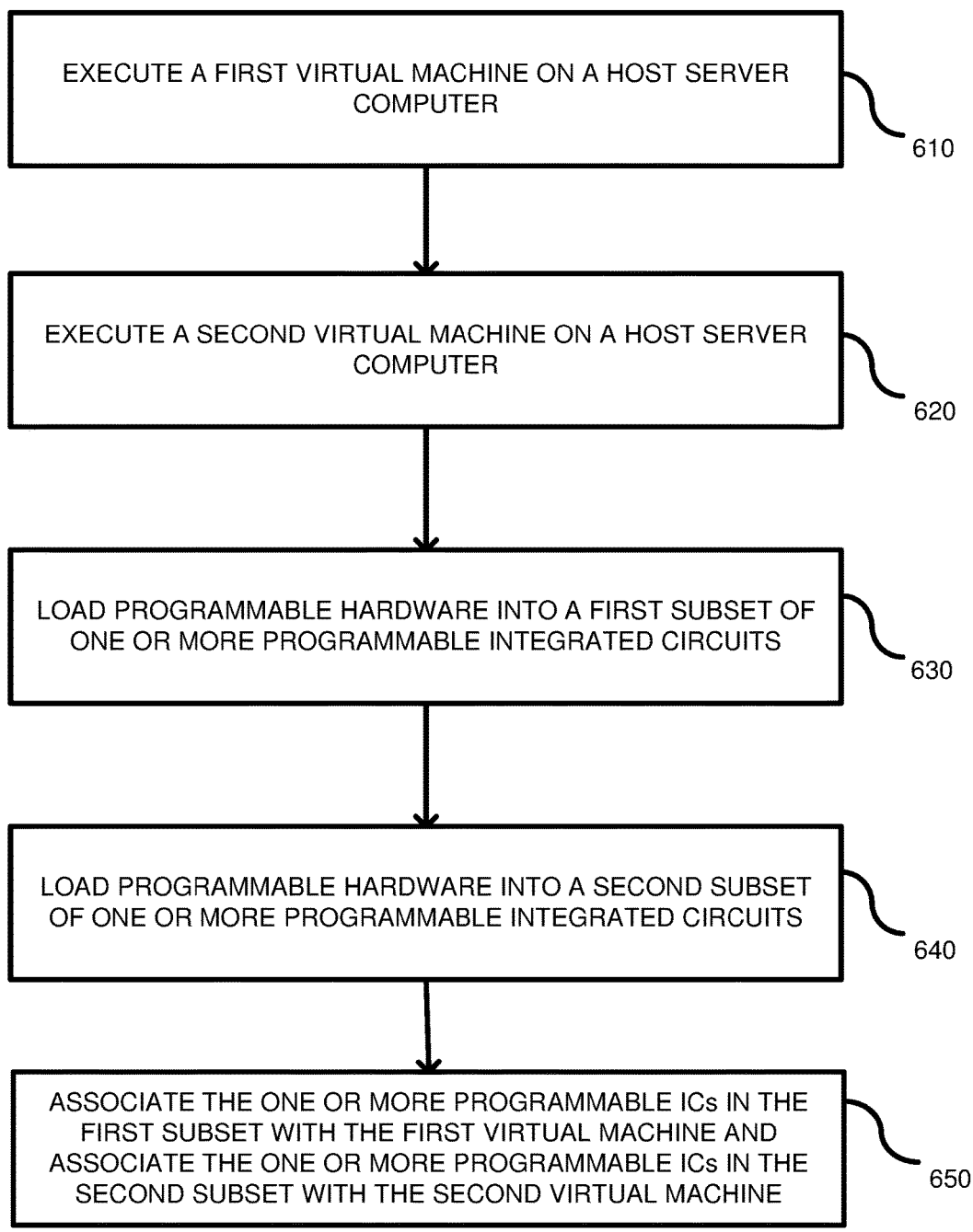
FIG. 6 is a flow diagram of an example method of operating multiple programmable ICs in a multi-tenant environment.

FIG. 6 is a flowchart of a method for controlling programmable hardware in a multi-tenant environment. In process block 610, a first virtual machine is executed on a host server computer. The virtual machine can be a local virtual machine on the host server computer. In other embodiments, the virtual machine can be located on a separate host server computer. In a particular example, the virtual machine on the separate host server computer can communicate through a network to a management hypervisor on the host server computer on which a programmable circuit is located. In process block 620, a second virtual machine is executed on the same host server computer. Like in process block 610, the second virtual machine can be remotely executed. Executing both the first and second virtual machines can typically be accomplished through launching the virtual machines on the host server computer in response to APIs from a customer associated with the virtual machines. FIG. 2 provides an example of two virtual machines 220, 230 executing on the same host server computer 210. While the virtual machines are executing, they are responsive to requests and can issue commands.

In process block 630, programmable hardware can be loaded into a first subset of one or more programmable ICs. Using the virtual machine, information needed to program the programmable hardware can be downloaded to the programmable ICs. Turning briefly to FIG. 1, the different programmable ICs can be programmed within the subset 170. Programming of the programmable ICs can include loading programmable hardware into the programmable ICs so as to affect function and/or performance. The loading of the programmable ICs can result in a first portion of programmable hardware being loaded by one virtual machine and a second portion of programmable hardware being loaded by another virtual machine, wherein the first and second portions are within the same IC, such as a single FPGA. In such a situation, each portion is sandboxed so that it cannot interfere with the other portion. The programmable hardware can include logic (AND gates, OR gates, etc.), as well as flip-flops, memory, and any other desired hardware components. The loading of the programmable hardware can be performed by the virtual machine instances. Alternatively, the loading can also be performed by the hypervisor. In yet another example, the programming can be accomplished by an external process (e.g., a process on a separate host server computer) acting through the control of the local hypervisor to load the programmable hardware into the programmable ICs.

In process block 640, programmable hardware can be loaded into the second subset of one or more programmable ICs. The loading of the programmable hardware is similar to process block 630.

In process block 650, one or more programmable ICs in the first subset are associated with the first virtual machine and one or more programmable ICs in the second subset are associated with the second virtual machine. Associating the virtual machine to the programmable ICs means that there is a mapping between the virtual machines and the programmable ICs such that communications (data, instructions, etc.) from the programmable IC can be routed to the virtual machine and vice versa.

Figure 7:
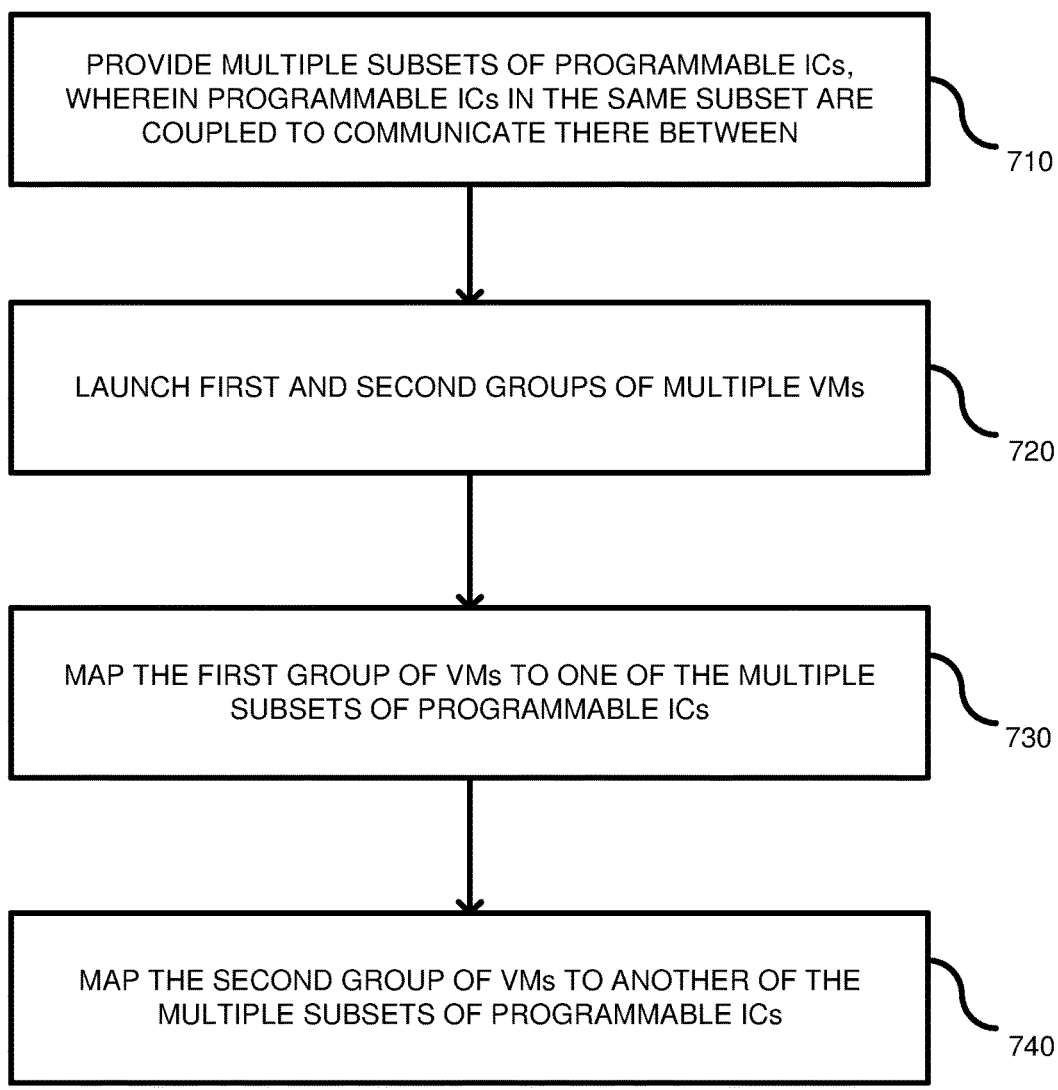
FIG. 7 is a flow diagram of an example method of mapping virtual machines to subsets of programmable ICs.

FIG. 7 is a flowchart of a method according to another embodiment. In process block 710, multiple subsets of programmable ICs are provided. A subset of programmable ICs includes one or more programmable ICs that are linked together for direct communication without passing through a hypervisor. An example of such a direct communication is a serial port wherein at least two programmable ICs are directly connected through a mutual serial bus. The subsets can be encapsulated such that one subset is not able to communicate directly with another subset, except through the management hypervisor. Typically, the subsets are controlled by different customers and a subset is associated with one customer, while the customer is unaware of other subsets or customers running on the same host server computer. In process block 720, a first and second group of multiple virtual machines are launched. The first group can be associated with a first customer and a second group can be associated with a second, different customer. Each group can have one or more associated virtual machines. The launching of the virtual machines means that the virtual machines are operational and can receive requests (e.g., API requests) and execute commands.

In process block 730, the first group of virtual machines are mapped to one of the subsets of programmable ICs. For example, in FIG. 1, requests from the virtual machines in the group 160 are transmitted to the subset of programmable ICs 170 and using the physical address of the programmable ICs, to the specific programmable IC desired. In this way, requests from the virtual machine instances can be properly routed to the correct programmable IC in the subset 170.

In process block 740, the second group of virtual machines are mapped to one of the subsets of programmable ICs. For example, in FIG. 1, a group 162 of virtual machines can be mapped to a second subset 172 of programmable ICs. Using address mapping, such as was described at 450 in FIG. 4, the requests from the virtual machine 162 can be routed to the appropriate programmable IC in the subset 172. Both subsets 170, 172 are isolated from one another and the customers associated with the subsets are typically not aware of the presence of the other customer operating on the same host server computer. Mapping of the virtual machines to the subset of programmable ICs allows the management hypervisor to encapsulate or sandbox the subsets of programmable ICs so that the different subsets can operate on the same server computer without knowing that the other subset is sharing resources.

Figure 8:
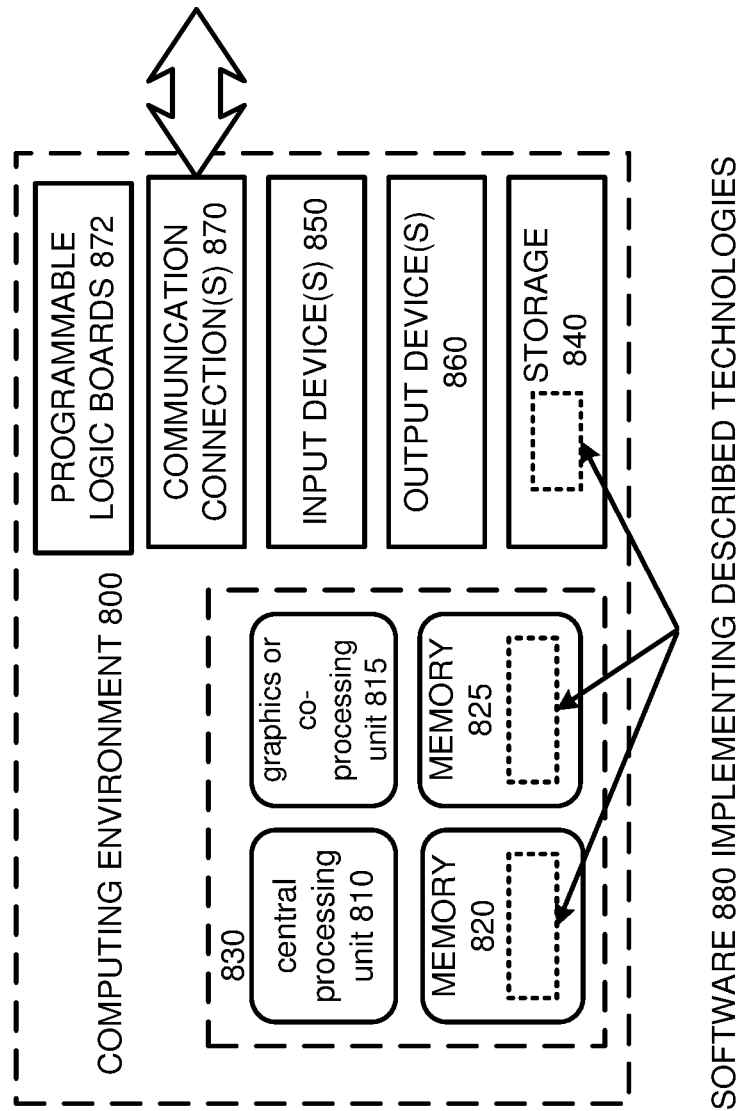
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.)

With reference to FIG. 8, the computing environment 800 includes one or more processing units 810, 815 and memory

820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier. Programmable logic boards 872 can include the programmable ICs as described herein. For example, the programmable logic boards 872 can include one or more programmable FPGAs. The boards 872 can be plugged into a bus, such as the PCIe bus to communicate with the main server processor and to other boards in the host server computer.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method, comprising:
    launching first and second virtual machines upon a central processing unit (CPU), wherein the CPU is coupled to multiple subsets of programmable Integrated Circuits (ICs);
    mapping the first virtual machine to one of the multiple subsets of programmable ICs; and
    mapping the second virtual machine to another of the multiple subsets of programmable ICs;
    wherein programmable ICs that are in the same subset are coupled together to communicate therebetween, and
    wherein the one subset of programmable ICs is isolated from the another subset of programmable ICs;
    wherein the isolation is accomplished through a host-controlled interface located on the programmable ICs that routes packets and controls transmission of the packets based on access privileges.

2. The method of claim 1, wherein the multiple subsets of programmable logic ICs include a first subset and a second subset, wherein the first subset has a different number of programmable ICs than the second subset.

3. The method of claim 1, further including providing a management hypervisor executing on the CPU that manages accessing the one subset and the another subset by the virtual machines.

4. The method of claim 1, further including configuring each subset of the multiple subsets of programmable ICs using a respective mapped virtual machine.

5. A method of controlling programmable hardware in a multi-tenant environment, comprising:
    executing a first virtual machine on a central processor of a host server computer;
    executing a second virtual machine on the central processor;
    loading first programmable hardware into a first subset of one or more programmable integrated circuits coupled to the central processor;
    loading second programmable hardware into a second subset of the one or more programmable integrated circuits coupled to the central processor; and
    associating the first programmable hardware with the first virtual machine and associating the second programmable hardware with the second virtual machine;
    wherein the first programmable hardware and the second programmable hardware are isolated and cannot communicate therebetween;
    wherein the isolation is accomplished by disabling a communication path between the first programmable hardware and the second programmable hardware, the communication path using a shared peripheral interface.

6. The method of claim 5, wherein a management hypervisor on the host server computer launches the first virtual machine and the second virtual machine.

7. The method of claim 5, wherein the loading of the first programmable hardware comprises configuring the first programmable hardware under direction of the first virtual machine and the loading of the second programmable hardware comprises configuring the second programmable hardware under direction of the second virtual machine.

8. The method of claim 5, wherein the loading of the first and second programmable hardware is performed by a management hypervisor on the host server computer or by a process external to the host server computer through control by the management hypervisor.

9. The method of claim 5, wherein the first subset includes at least a first programmable integrated circuit and a second programmable integrated circuit and wherein the first programmable integrated circuit communicates directly with the second programmable integrated circuit through a communication channel.

10. The method of claim 9, wherein the communication channel is a serial port including one or more lanes of serial communication.

11. The method of claim 9, wherein the second subset includes a different number of programmable integrated circuits than the first subset.

12. The method of claim 5, wherein the first subset of one or more programmable integrated circuits are physically or logically isolated from the second subset of one or more programmable integrated circuits.

13. The method of claim 12, wherein the first subset of one or more programmable integrated circuits cannot detect a presence of the second set of one or more programmable integrated circuits in the multi-tenant environment.

14. The method of claim 5, wherein the programmable integrated circuits are Field Programmable Gate Arrays (FPGAs).

15. The method of claim 5, wherein respective portions of the first programmable hardware and the second programmable hardware are loaded into a shared programmable integrated circuit of the one or more programmable integrated circuits.

16. An apparatus, comprising:
    a host server computer;
    a first programmable integrated circuit (IC) within the host server computer;
    a second programmable IC within the host server computer; and
    the host server computer having a processor configured to execute a management hypervisor and multiple virtual machines including at least a first virtual machine for operating the first programmable IC and a second virtual machine for operating the second programmable IC;
    wherein the first programmable IC and the second programmable IC are isolated from each other by disabling a communication path between the first programmable IC and the second programmable IC, the communication path using a shared peripheral interface.

17. The apparatus of claim 16, further including a third programmable IC coupled to the first programmable IC, wherein the first programmable IC and the third programmable IC are coupled together for communication therebetween.

18. The apparatus of claim 17, further including a fourth programmable IC within the host server computer, wherein the fourth programmable IC is isolated from the first and third programmable ICs and is coupled to the second programmable IC.

19. The apparatus of claim 16, wherein the first programmable IC is in a first subset of programmable logic, and the second programmable IC is in a second subset of programmable logic, and wherein the host server computer includes multiple subsets of programmable logic that are controlled in isolation by the first and second virtual machines.

20. The apparatus of claim 19, wherein the first subset includes a different number of programmable ICs than the second subset.

* * * * *